Aug. 29, 1967     A. R. HILTON, JR., ET AL     3,338,728
GE-P-TE GLASSES AND METHOD OF MAKING SAME
Filed March 2, 1964                    2 Sheets-Sheet 1
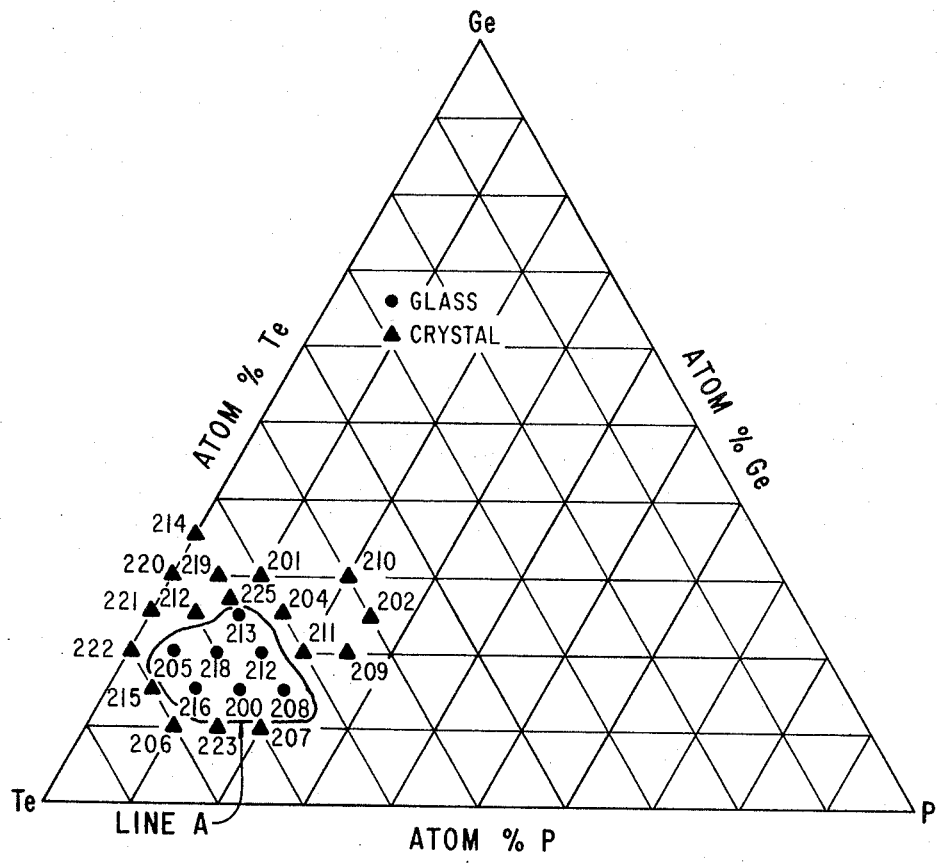
Fig. 1
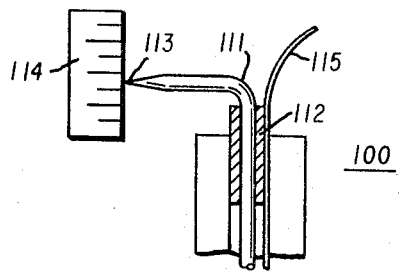
Fig. 2
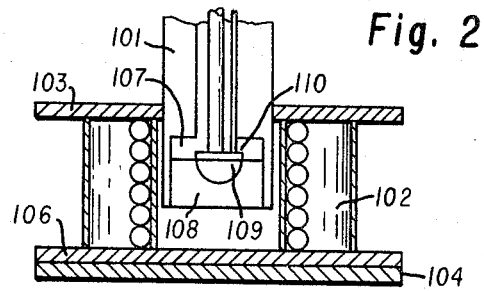
ALBERT RAY HILTON, JR.
CHARLIE EARL JONES, JR
MAURICE J. BRAU
INVENTORS
BY *Harold Levine*
ATTORNEY

United States Patent Office 3,338,728
Patented Aug. 29, 1967

3,338,728
Ge-P-Te GLASSES AND METHOD OF MAKING SAME
Albert Ray Hilton, Jr., Charlie Earl Jones, Jr., and Maurice J. Brau, Richardson, Tex., assignors to Texas Instruments Incorporated, Dallas, Tex., a corporation of Delaware
Filed Mar. 2, 1964, Ser. No. 348,643
5 Claims. (Cl. 106—47)

ABSTRACT OF THE DISCLOSURE

Disclosed are compositions of matter comprising germanium, phosphorus, and tellurium, some samples of which have been found to be amorphous glasses transmitting in the infrared region of the electromagnetic spectrum, and some of which have been found to be crystalline. Also disclosed are methods of compounding the compositions of matter and apparatus for measuring the softening point of the glasses.

---

This invention relates to amorphous compositions of matter. More particularly it relates to infrared transparent glasses and to a method of making same.

The invention disclosed herein appertains to germanium phosphorus-tellurium amorphous glass compositions which are transparent to the infrared region of the electromagnetic spectrum. Moreover, the invention provides compositions of matter having good transmission in the one to 25 micron wave-length region of the electromagnetic spectrum.

The glass of the invention may contain about 11 to 26 atom percent germanium, 61 to 79 atom percent tellurium, and 3 to 25 atom percent phosphorus. The amorphous composition of matter of the invention may be made by forming a melt of the constituents and quench-cooling the melt from about 950° C. to 1000° C. to room temperature in air.

It is therefore an object of the invention to provide an amorphous composition of matter comprising in major proportion or consisting essentially of germanium, phosphorus, and tellurium.

Another object of the invention is to provide an amorphous composition of matter having a high transmission in the one to 25 micron wave-length region of the electromagnetic spectrum.

A further object of the invention is to provide an amorphous composition of matter comprising in major proportion or consisting essentially of from 11 to 26 atom percent germanium, 61 to 79 atom percent tellurium, and 3 to 25 atom percent phosphorus.

Another object of this invention is to provide a ternary germanium-phosphorus-tellurium amorphous composition of matter having good transmission at high temperatures in the one to 25 micron wave-length region of the electromagnetic spectrum.

A further object of the invention is to provide a method of making a ternary amorphous composition of matter having a transmission in the one to 25 micron region of the electromagnetic spectrum.

It is still a further object of the invention to provide a quench-freeze method of making ternary germanium-phosphorus-tellurium amorphous compositions of matter having high softening points.

Still another object of the invention is to provide a ternary germanium - phosphorus - tellurium amorphous composition of matter exhibiting a high softening point and good transmission in the one to 25 micron region of the electromagnetic spectrum.

These and other objects, advantages, and features of the invention will become more readily apparent from the following detailed description taken in conjunction with the appended claims and attached drawings wherein:

FIGURE 1 depicts a ternary diagram of the atomic percentages of germanium, phosphorus, and tellurium for various amorphous compositions of matter of the invention;

FIGURE 2 illustrates a Soft-Point apparatus utilized in obtaining characteristic properties of the glass.

Figure 3:
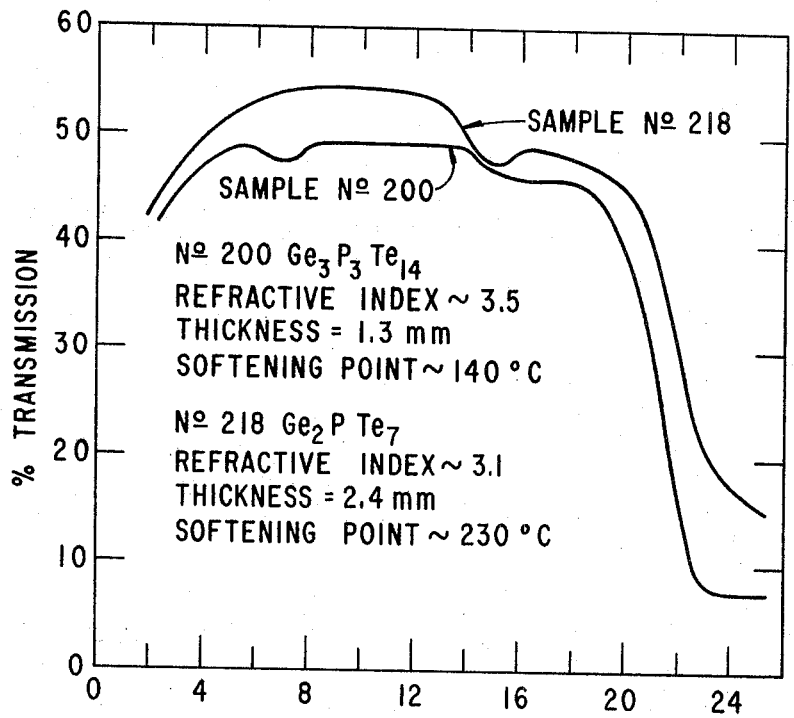
FIGURE 3 is a graphical representation of percent transmission at room temperature at various wave lengths of the electromagnetic spectrum for various glass compositions according to this invention.

Referring to FIGURE 1, various compositions of germanium, phosphorus, and tellurium were compounded and evaluated to determine whether they were amorphous or crystalline. The general procedure for making the various compositions is described hereinafter.

Various atomic percents of germanium, tellurium, and phosphorus were chosen for each sample to be made. The appropriate amounts of the constituents were weighed and then placed in a previously cleaned quartz ampoule. An example of a suitable cleaning step for the ampoule is by etching 30 minutes in a 10% solution of concentrated hydrofluoric (48% HF) acid, rinsing in deionized water about 15 minutes, treating with aqua regia, rinsing in deionized water, and then drying. The total weight of each of the samples was between five and 15 grams. The constituents were placed in the cleaned tube and evacuated to about $10^{-4}$ torr and sealed. The sealed tubes were then placed in a furnace and gradually heated to a temperature of about 950° C. to 1000° C. and held at that temperature for about 15 to 36 hours to provide sufficient time for the constituents to react completely with each other. The furnace was a rocking furnace which may be of any suitable design to provide agitation of the constituents so as to achieve maximum, complete reaction thereof. The samples were then removed from the furnace and held in a vertical position in air for air quenching and allowed to cool to room temperature.

The sample compositions which failed to form amorphous glass by the air quench-cooling technique and were crystalline after quenching are presented in Table I below, whereas the compositions which formed amorphous glass are presented in Table II below with the Soft-Point results achieved for the glass. The reaction condition for the samples in Tables I and II below were the same. The samples were held at a temperature between 950° C. and 1000° C. for a period of about 15 to 36 hours.

TABLE I

| Sample No. | Composition Atomic Percent | | |
|---|---|---|---|
| | Ge | P | Te |
| 201 | 30 | 10 | 60 |
| 202 | 25 | 25 | 50 |
| 204 | 25 | 15 | 60 |
| 206 | 10 | 10 | 80 |
| 207 | 10 | 20 | 70 |
| 209 | 20 | 25 | 55 |
| 210 | 30 | 20 | 50 |
| 211 | 20 | 20 | 60 |
| 214 | 35 | | 65 |
| 215 | 15 | 5 | 80 |
| 217 | 25 | 5 | 70 |
| 219 | 30 | 5 | 65 |
| 220 | 30 | | 70 |
| 221 | 25 | | 75 |
| 222 | 20 | | 80 |
| 223 | 10 | 15 | 75 |
| 224 | 25 | 5 | 70 |
| 225 | 27 | 8 | 65 |

TABLE II

| Sample No. | Composition Atomic Percent | | | Softening Point in ° C. |
|---|---|---|---|---|
| | Ge | P | Te | |
| 200 | 15 | 15 | 70 | 130–145 |
| 205 | 20 | 5 | 75 | 152–165 |
| 208 | 15 | 20 | 65 | 186–190 |
| 212 | 20 | 15 | 65 | 268–271 |
| 213 | 25 | 10 | 65 | 386–390 |
| 216 | 15 | 10 | 75 | 130–134 |
| 218 | 20 | 10 | 70 | 232 |

In FIGURE 1 the peripheral Line A generally circumscribes the amorphous compositions of germanium, phosphorus, and tellurium according to this invention. The samples which failed to form amorphous glass by the air quench-cooling technique (listed in Table I) are plotted on FIGURE 1 by a block triangle and identified by sample number. The sample compositions forming amorphous glass listed in Table II are also plotted in FIGURE 1 within the area generally circumscribed by Line A and designated by black dots and each identified by sample numbers.

Referring specifically to FIGURE 2, there is schematically illustrated an apparatus suitable for use in determining the Soft-Point listed in Table II. The apparatus, generally referred to as 100, consists of a quartz tube 101 supported within a heating mantle 102 by mounting plate 103. The heating mantle 102 has a base plate 106 seated on an asbestos pad 104. The quartz tube 101 has an enlarged bore 107 which retains a boron nitride sample holder 108 having a hollow depression 109 therein. A sample slice 110 to be tested for Soft-Point is placed over the depression 109. A quartz rod 111 is supported within the quartz tube 101, resting against the surface of sample 110. To maintain the quartz rod in vertical alignment with respect to the quartz tube 101, a quartz guide 112 is provided. At the upper end of the quartz rod 111 a right angle bend is provided therein and the end of the quartz rod tapered to form a pointer 113. A scale 114 is provided to show movement of the quartz rod 111. The scale 114 is supported by means not illustrated in fixed relation to the sample slice 110. A thermocouple 115 is provided abutting the sample surface for measuring the temperature of sample 110.

In operation of the Soft-Point test apparatus 100, an amorphous glass sample 110 is placed in its proper position and heat is applied by the heating manifold 102. The temperature of the sample is slowly increased until the quartz rod 111, under the influences of its weight, deforms the sample 110, the amount of the deformation being indicated by the pointer 113 moving over the scale 114.

The room temperature transmission of the various samples at various wave lengths of the electromagnetic spectrum are presented in Table III below.

TABLE III.—INFRARED TRANSMISSION OF SOME Ge-P-Te GLASSES

| | Sample No. | | |
|---|---|---|---|
| | 205 | 208 | 216 |
| Sample Thickness, mm | 1.28 | 1.32 | 1.35 |
| Refractive Index | 3.5 | 3.5 | |
| | Percent Transmission | | |
| Wave Length, Microns: | | | |
| 2.5 | 40 | 42 | 40 |
| 3 | 41 | 45 | 41 |
| 4 | 43 | 47 | 43 |
| 5 | 44 | 48 | 45 |
| 6 | 45 | 51 | 45 |
| 7 | 45 | 47 | 44 |
| 8 | 45 | 50 | 45 |
| 9 | 45 | 50 | 45 |
| 10 | 47 | 50 | 45 |
| 11 | 46 | 50 | 45 |
| 12 | 49 | 51 | 46 |
| 13 | 48 | 50 | 46 |
| 14 | 48 | 51 | 47 |
| 15 | 47 | 51 | 46 |
| 16 | 48 | | |
| 17 | 48 | | |
| 18 | 47 | | |
| 19 | 47 | | |
| 20 | 45 | | |
| 21 | 40 | | |
| 22 | 31 | | |
| 23 | 20 | | |
| 24 | 20 | | |
| 25 | 17 | | |

In FIGURE 3, the percent transmission of the electromagnetic spectrum in the one to 25 micron wave-length region is plotted for various of the glass samples contained in Table II with an indication given as to index of refraction (N) and thickness of sample.

It should be understood that although most of the samples discussed above were essentially germanium, phosphorus, and tellurium, minor percentages of silicon, selenium, sulfur, antimony, arsenic, bismuth, etc., may be used in the glass of the invention to provide variations in the softening point and transmission of the glass compositions.

Although only the air quench-cooling method has been described for making the amorphous compositions of matter of the invention, other methods could be used. In some instances it would be desirable to slow cool the glass composition so as to achieve uniform properties when making the composition in large batches. Furthermore, the limits of composition for making amorphous material may be extended by more rapid quenching than provided by air quenching. Also, to achieve amorphous composition, the initial temperature for forming the melt may be extended several 100 degrees higher than described herein.

It should be appreciated that many other variations and changes to the invention will immediately suggest themselves to those skilled in the art and such variations and changes are deemed to be within the purview and scope of the invention as defined in the appended claims.

What is claimed is:

1. Glass compositions comprising germanium, tellurium, and phosphorus, and having a composition within the range of 11 to 26 atomic percent germanium, 61 to 79 atomic percent tellurium, and 3 to 25 atomic percent phosphorus and lying generally within the region circumscribed by Line A of FIGURE 1.

2. The method of making glass compositions for transmitting the one to 25 micron wave-length portion of the electromagnetic spectrum comprising the steps of placing germanium, tellurium, and phosphorus having a composition within the boundary generally circumscribed by Line A of FIGURE 1 into a reaction vessel, evacuating and sealing said vessel, agitating said vessel while heating said vessel to a temperature and for a period of time sufficient to form a melt of said composition and to completely react said germanium, tellurium, and phosphorus, and quench-cooling said melt while sealed in said vessel.

3. The method of claim 2 in which the melt is quenched in a room temperature ambient.

4. The method of claim 2 and wherein said temperature is about 950° C. to 1000° C.

5. The method of claim 4 and wherein said period of time is about 15 to 36 hours.

References Cited

UNITED STATES PATENTS 3,216,721   7/1966   Cornish _____ 23—315

HELEN M. McCARTHY, *Primary Examiner.*